United States Patent [19]

Rogowsky

[11] Patent Number: 4,459,492

[45] Date of Patent: Jul. 10, 1984

[54] METHOD FOR OPERATING A HIGH VOLTAGE DIRECT CURRENT TRANSMISSION SYSTEM INCLUDING ANY DESIRED NUMBER OF TRANSFORMER STATIONS

[75] Inventor: York Rogowsky, Berlin, Fed. Rep. of Germany

[73] Assignee: Licentia Patent-Verwaltungs-GmbH, Frankfurt am Main, Fed. Rep. of Germany

[21] Appl. No.: 426,164

[22] Filed: Sep. 28, 1982

[30] Foreign Application Priority Data

Jul. 3, 1982 [DE] Fed. Rep. of Germany ....... 3225285

[51] Int. Cl.³ .............................................. H02N 3/46
[52] U.S. Cl. ..................................... 307/82; 363/35; 363/67; 363/71
[58] Field of Search ....................... 307/82, 83, 20, 24, 307/146; 363/34, 35, 51, 67, 71

[56] References Cited

U.S. PATENT DOCUMENTS

| 4,212,055 | 7/1980 | Podlewaki | 363/71 |
| 4,328,429 | 5/1982 | Kuslick | 307/82 X |
| 4,379,325 | 4/1983 | Krampe et al. | 363/35 |

FOREIGN PATENT DOCUMENTS

| 1033808 | 6/1978 | Canada . |
| 1588750 | 1/1970 | Fed. Rep. of Germany . |
| 1488085 | 12/1970 | Fed. Rep. of Germany . |
| 1588067 | 9/1971 | Fed. Rep. of Germany . |
| 1523555 | 8/1973 | Fed. Rep. of Germany . |
| 2518910 | 8/1976 | Fed. Rep. of Germany . |
| 2109763 | 10/1980 | Fed. Rep. of Germany . |

OTHER PUBLICATIONS

Comparison of Suitable Control Systems for HVDC Stations Connected to Weak AC Systems, by Ranade and Rumpf, May 1971, IEEE Trans. on Power, vol. PAS-91, No. 2.
Power Transmission by D.C. by Uhlmann, 1975.
Design & Testing of Thyristor Valves and their Components for the HVDC, by P. Lips, 9/1/82.

*Primary Examiner*—E. A. Goldberg
*Assistant Examiner*—Derek S. Jennings
*Attorney, Agent, or Firm*—Spencer & Frank

[57] ABSTRACT

A method of operating a high voltage DC transmission system with any number of transformer stations. Transformer stations which operate as rectifier stations operate with voltage regulation having a current dependent control input. In the range from 1 per unit to $1-\delta$ per unit of rated voltage, a hard current limit is in effect, and in the range from $1-\delta$ per unit to $1-\delta-\epsilon$ per unit rated voltage, the current limiting value is reduced to a minimum current, where $\delta$ and $\epsilon$ are preselected fractions. Transformer stations which operate as inverter stations principally operate with current regulation and in the voltage range from 1 per unit to $1-\delta$ per unit of rated voltage, the maximum desired current value is reduced from rated current value down to zero.

4 Claims, 16 Drawing Figures

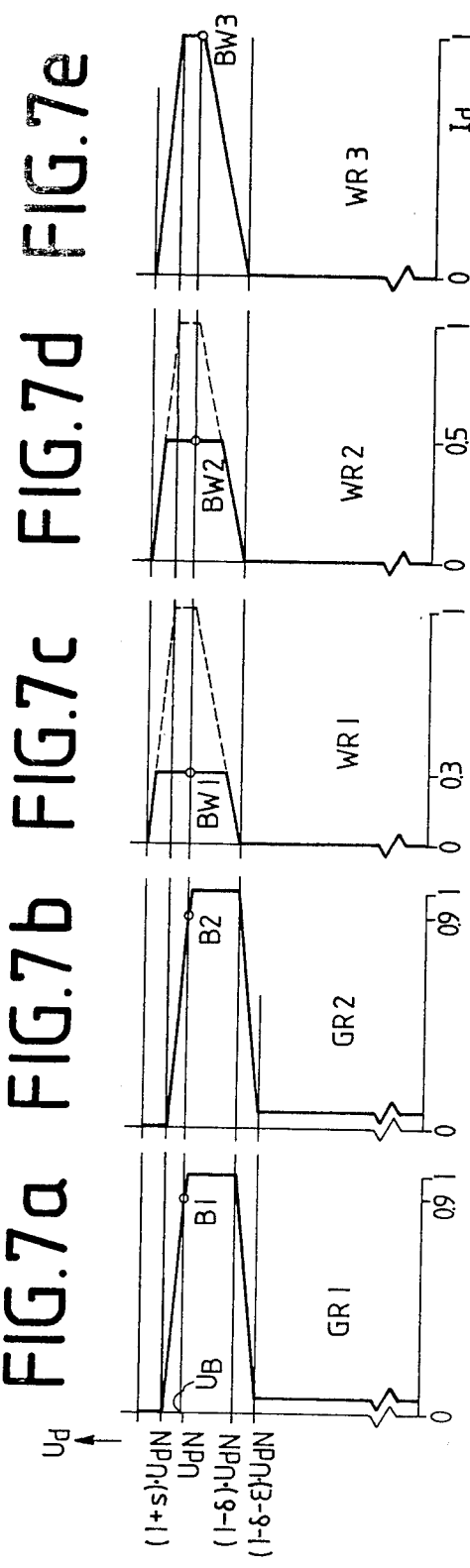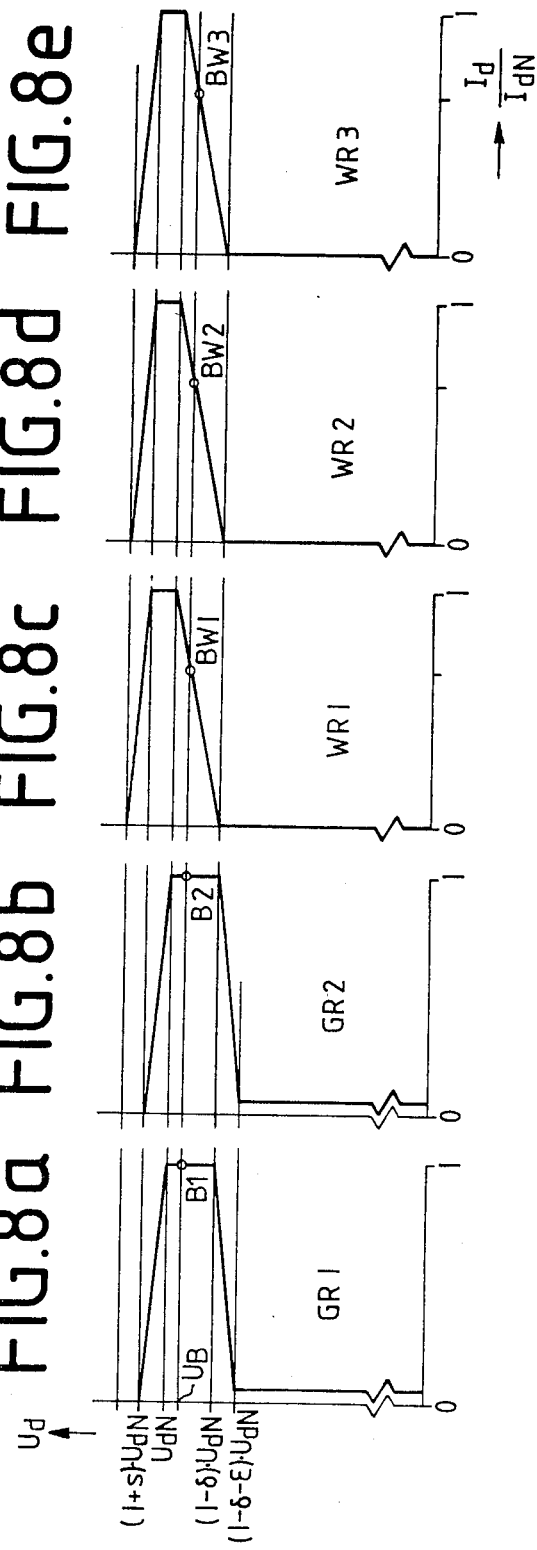

METHOD FOR OPERATING A HIGH VOLTAGE DIRECT CURRENT TRANSMISSION SYSTEM INCLUDING ANY DESIRED NUMBER OF TRANSFORMER STATIONS

BACKGROUND OF THE INVENTION

The present invention relates to a method for transmitting power and in particular to a method for transmitting power between a plurality of locally separated transformer stations of a high voltage DC transmission system.

In prior art systems for high voltage direct current transmission (HGÜ) that include only two stations, a direct current transmission line or cable connects the stations together at their DC ends, while the AC end of each station is connected to the local three-phase mains. In such a "two-point" HGÜ, one station takes energy from the local three-phase mains and feeds it, rectified, into the direct current line. At the other end of the line, the other station operates as an inverter which transforms the energy of the direct current into a three-phase current and feeds it to the local three-phase mains. The operation of the inverter station is performed by a rectifier in inverter operation.

This rectifier in inverter operation is a critical element in the arrangement. When there are malfunctions in the connected three-phase mains, there may occur commutation errors, referred to as flipping, as a result of which the direct voltage across the terminals of the inverter station breaks down. In order to prevent excess current loads on the components of the inverter, particularly its current valves or controllable elements, the rectifier station is equipped with a regulating device which keeps its direct current constant at a settable value. In this way it is possible to keep the current in the transmission line connecting the rectifier and inverter stations at a given value even if the inverse inverter voltage breaks down and thus protect the inverter station against current overloads.

Another aspect to be considered in equipping the stations is the reactive power to be produced by the stations from the three-phase mains. The reactive power received by the rectifier station is proportional to the magnitude of the direct current produced thereby and increases with the size of the control, or conduction, angle of the valves, a maximum occurring at a control angle of 90°, at which the direct voltage is approximately zero. Therefore, the inverter station is operated with the smallest possible control angle $\beta$ at which stable operation is just assured. The quench angle $\gamma$ of the valves in the inverter station is also measured and regulated and is characteristic for stable operation. The direct voltage of the transmission is set via the step setter of the inverter transformers. The rectifier station must have the smallest possible control angle $\alpha$ in that the idle, or no load, voltage of the rectifier station follows the step setters of the rectifier transformers in the sense of keeping the small control angle constant.

The control angle $\alpha$ is defined to be the electrical angle from the time when the anode-voltage of the valve becomes positive up to the firing instant. The control angle $\beta$ is defined to be the electrical angle from the firing of the valve up to the point where the commutation voltage becomes negative. From this results $\alpha + \beta = 180°$. The quench angle $\gamma$, or as it is called the extinction angle, is the electrical angle from the valve current extinction point up to that point the commutation-voltage becomes negative.

Because the setting of the transformer step setters takes place relatively slowly, if a rapid increase in current is required, it is necessary that the inverter temporarily reduce its inverse voltage until the step setter of the rectifier has adjusted the idle voltage to the required higher value. This is accomplished by equipping the rectifier in the inverter station with a current regulator which is limited in a dominating fashion by a quench angle regulator in the direction toward smaller control angles $\beta$. If the current regulator in the inverter station receives a current control input which is marginally smaller than the direct current flowing in the transmission line, as determined by the current regulator of the rectifier station, then the inverter current regulator attempts to decrease the control angle $\beta$ and thus reaches the limit defined by the quench angle regulator so that ultimately the operation is determined by the quench angle regulator. If, however, the direct current in the transmission line becomes smaller than the given current control input of the inverter current regulator, because, for example, the current regulator in the rectifier station is unable to set a current corresponding to its current control input, even with a control angle of $\alpha=0$ (i.e. during a rapid intentional current increase or if one of a plurality of series connected partial current rectifiers is malfunctioning) then the inverter current rectifier is able to set a larger control angle, thus reducing the inverse voltage of the inverter station so that the current in the transmission line is kept to a value which is lower by the marginal value instead of dropping completely to zero.

For proper operation with such a "marginal current method" it is necessary for the current control input of the current regulator in the rectifier station to always be greater by the marginal value, or at least greater in any case, than the current control input of the current regulator in the inverter station. In such a system, the station having the larger current regulator current control input always plays the part of the rectifier station and thus determines the direction of energy transmission. It is possible to avoid a reversal of direction in the energy transmission due to erroneous association of the current control input by employing control angle range limitations, or the malfunction can be limited to only a change in the transmitted power to zero. It is thus very important for the current control input association to always be correct. This is accomplished by appropriate long-distance signal transmission devices as disclosed in German Auslegeschrift No. 1,488,085.

The marginal current system has been found to be particularly satisfactory in two-point HGÜ's because of its emergency operation characteristics. These same characteristics have led to its use in a system employing more than two stations. The stations are divided into a rectifier group and an inverter group with respect to a real or fictitious common point in the DC network, and the rules of the marginal method are used for both groups. (See, for example, German Auslegeschrift No. 1,488,085.)

The main requirement for multistation operation according to the marginal current method is that the sum of the current regulator current control inputs of all rectifier stations must always be greater than the sum of all such inputs of the inverter stations. In such a system the current in all stations is regulated except for the current in one station which reaches an operating state that determines the voltage for the DC system. This one station operates either as an inverter or a rectifier station. As an inverter station with quench angle regulation, it must be able to receive a current corresponding to its current control inputs and additionally the marginal value. As a rectifier station it operates with a control angle of zero. Due to the possibility of overloading an inverter station, the marginal value must not be selected too large. It is then necessary to quickly and accurately follow up with all current control inputs when the power of such a station is to be changed. This requires a central load equalization, as described in German Pat. No. 1,523,555, which requires a considerable amount of expense for remote reporting, or monitoring telecommunications.

If in the plurality of inverter stations, one station is included which has a smaller rated power than the others, the additional marginal current in it may, under certain circumstances, lead to an overload, unless the rated power of that station is raised accordingly. Since it is desirable that such a station not become voltage determining for the DC system, special measures must be taken to associate the voltage control variable of the DC system with a certain station.

One drawback of such a system is that the malfunction of a series-connected partial rectifier in one station leads to a corresponding voltage reduction and thus to a power reduction in the entire system. This state can be avoided by additional voltage limitation, as disclosed in German Auslegeschrift No. 1,588,067, which simultaneously reduces the requirements for telecommunication connections. Nevertheless, a central load equalization of the current control inputs is still required as in other marginal current systems.

To avoid the above-described difficulties of the marginal current method German Offenlegungschrift No. 1,588,750 discloses a method which operates with voltage-dependent controlled current control inputs and does not require remote signal transmission for operation. All stations operate with regulated current. The current regulators of the individual stations are thus given current/voltage characteristics of a natural type, i.e. the rectifier as the current source has a characteristic which descends with increasing current and the inverter as current user has a characteristic which ascends with increasing current. The points of intersection of the current/voltage characteristics indicate the stable operating point of the system. The drawback in this case is that the points of intersection, particularly those of the inverter characteristics, are points of intersection at a small angle (sliding intersections) and are thus not very precise. This can easily lead to overloads, particularly in an inverter station of low power compared to the other stations. Changes in load, moreover, can be accomplished only very slowly because they require a change in the transformer step setter.

German Auslegeschrift No. 2,518,910 describes a method for solving the problem of providing power to inverter stations without mutual influence while avoiding central matching of the current control input. A current dependent voltage regulator is provided in the rectifier station with a current control input having a single, fixed current limitation which is higher, by a set marginal value, than the power capability of the station. A voltage dependent current regulator is provided in each of the inverter stations in which the maximum value of the current control input for the current regulator is determined without detailed information of the calculating circuitry employed according to a current-/current characteristic matched to the power capability of the rectifier station. By itself, the voltage of the mains provides information about the power capability of only a single rectifier station. This method cannot be transferred to a system including a plurality of rectifier stations. Since it is not known which stations are in operation at any point in time it is not possible to draw a conclusion as to the power capability of any one rectifier station from the mains voltage.

SUMMARY OF THE INVENTION

It is an object of the present invention to provide a method of the above-mentioned type in which unequivocal operating points can be set relative to any number of rectifier and inverter stations, without complicated telecommunications devices for central load matching, without the provision of a special marginal current for current limitation in connection with the current control input for the rectifier, and without the use of different current/current characteristics for each rectifier station for the formation of the maximum value of the current control input for the inverter current regulators, which characteristics would be complicated to calculate.

The above and other objects are accomplished according to the invention wherein a method is provided for transmitting power between a plurality of locally separated transformer stations of a high voltage DC transmission system in which each station has a DC end and an AC end. The DC end of each station is connected to a respective one of a plurality of transmission lines connected in network having a common network point. Each station is connected at its AC end with a respective local three-phase network. Each station includes a rectifier portion having a positive pole and a negative pole and a polarization reversal switch for selectively connecting the respective one of the transmission lines to its positive pole for operation of the station as a rectifier station or to its negative pole for operation of the station as an inverter station. Each station is operated to maintain a direct current in its respective transmission line and a direct voltage at that pole which is connect to its respective transmission line. At least one transformer station is connected as a rectifier station and at least one transformer station is connected as an inverter station. The method includes controlling the rectifier portion of each station via a first regulating device to regulate the direct current in the respective transmission line to a desired value, and further controlling the rectifier portion of each station via a second regulating device which dominates the first regulating device to set the direct voltage at that pole of each station which is connected to the respective transmission line to a given limit value with reference to the common network point. In the at least one rectifier station the step of controlling to set the direct voltage includes reducing the given limit value linearly with the direct current until the given limit value reaches a rated direct voltage value of that rectifier station at a rated direct current value of that rectifier station, and the step of controlling to regulate the direct current includes adjusting the desired value of the direct current in dependence on the direct voltage value of that rectifier station such that in a voltage range from 1 per unit of rated voltage value to $1-\delta$ per unit of rated voltage value the desired direct current value corresponds to the rated direct current value and in a voltage range from $1-\delta$ per unit of rated voltage value to $1-\delta-\epsilon$ per unit of rated voltage value the desired direct current value is linearly reduced to a preset minimum value, where $\delta$ and $\epsilon$ are preselected fractions. In the at least one inverter station, the step of controlling to regulate the direct current includes limiting the value of desired direct current in linear dependence on the direct voltage value of that inverter station, starting from the rated current value of the inverter station at a direct voltage of 1 per unit of rated voltage value down to zero current at a direct voltage of $1-\delta$ per unit of rated voltage value.

The method thus provides advantageous measures for operating an HGÜ network having any desired number of stations. The problems of dividing the load between rectifier stations of emergency operation during lack of power in the mains and the avoidance of overloads during malfunctions of individual rectifier stations are thus solved in a simple manner.

In each rectifier station, a current dependent voltage regulator is provided whose current control input depends on the current actually occurring in the station. There thus exists a fixed and a voltage dependent current limitation. The current limit in each of the inverter stations is linearly reduced during its formation to the range of the current limit at which the rectifier stations operate, without requiring a current/current characteristic and the setting of a marginal current. Rather, all of the characteristics for all rectifier stations and for all inverter stations, respectively, have the same per unit values, with the actual limit state of all rectifier stations being detectable in the voltage in the range from 1 to $1-\delta$ per unit.

The present invention can thus be used in an HGÜ system which comprises a plurality of stations including, for example, 10 such stations. The stations may have different rated powers and may be divided into any number of rectifier and inverter stations so long as there is at least one station of each type. In such a network, if a malfunctioning station were to reduce its voltage by, for example, one half, steps must be taken to ensure that the other stations do not lose half their power due to the malfunctioning station. The present invention is therefore based on the realization that multistation operation in a larger DC network with parallel connected stations can be performed sensibly only with a constant network voltage, and stations which are unable to hold their voltage must be disconnected. To allow for rapid reaction for intentional changes in load, all stations are operated with a constant direct idle voltage. Such intentional changes in load may occur, for example, when auxiliary power is fed into a three-phase network because the network has lost a generator. Thus, a larger control angle and higher reactance capability must be maintained for operation under partial load conditions than for operation under full load conditions. In this manner the reactive power designed for full load operation in the form of capacitors, filter circuits and phase shifters connected at the three-phase end of the rectifier station exceeds the reactive power required by the rectifier station.

These conditions lead to an undesirable increase in the three-phase voltage, particularly in "weak" three-phase networks, i.e. those having a high internal resistance. It is therefore desirable to avoid such excess reactive power by either disconnecting compensation means or by intentionally enlarging the control angles to thereby increase the reactance power absorbed by the rectifier station in partial load operation. The operation of the rectifier stations with constant direct idling voltage, in the sense of the present invention, therefore meets the demands of the connected networks. Only at rated operation do the rectifier stations absorb the reactive power corresponding to the minimum control angle.

With respect to the inverter stations, stable inverter operation is assured by regulating the quench angle at the rated operating point. Under partial load conditions, the quench angle is larger and thus inverter operation is more reliable. Accordingly, nothing is changed in the station design compared to those in prior art embodiments for multistation operation. In the arrangement according to the invention, the step setters at the transformers only serve the purpose of compensating the generally slower occurring changes in the voltage of the three-phase network so as to keep the idle voltage of the rectifier stations constant.

According to the invention, all rectifier stations are operated with voltage regulation and a current dependent control permits parallel operation of these stations. The rectifier stations are additionally equipped with a current regulator which produces an absolute current limitation. All inverter stations are equipped with a current regulator which assures that the desired current is supplied. As long as none of the rectifier stations reach their absolute current limit which would reduce the direct voltage of the network to below rated value, each inverter station can freely set its current between 0 and rated value. In the range between the rated network voltage value (1 per unit) and $1-\delta$ per unit rated voltage, the desired current for each inverter station is reduced from 1 per unit at rated voltage to 0 at $1-\delta$ per unit rated voltage. In this way, the law applicable for any type of multistation operation (i.e. that sum of the inverter station current control inputs must be less than or equal to the sum of the rectifier station current control inputs over the mains voltage as the information value) is automatically adhered to without requiring any special telecommunications connection.

BRIEF DESCRIPTION OF THE DRAWINGS

FIGS. 7a–7e are diagrams illustrating the operation of a network with five stations operated according to the invention.

FIGS. 8a–8e are diagrams illustrating the operation in another operating state of a network having five stations operating according to the invention.

DETAILED DESCRIPTION OF THE INVENTION

Figure 1:
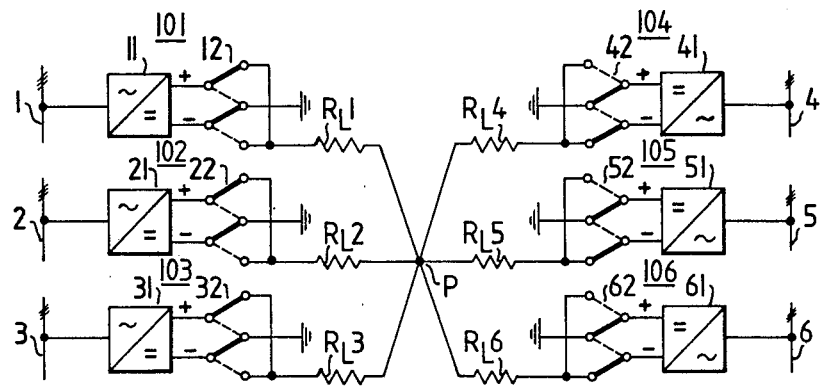
FIG. 1 shows a DC transmission network comprising six transformer stations.

FIG. 1 shows six transformer stations 101–106 which are connected, respectively, to six three-phase networks 1-6. Each transformer station 101-106 includes a rectifier portion 11, 21 ... 61, respectively, and a polarization switch 12, 22 ... 62, respectively. Rectifier portions 11, 21 ... 61 of each station 101-106, respectively, each have a current output pole marked "+". The role of each station 101-106 as a rectifier (feeding energy into the DC network) or as an inverter (delivering energy from the DC network) is fixed by virtue of its connection to the DC network by means of polarization switches 12, 22 ... 62, respectively. In FIG. 1 each station has only one pole to ground. In practice, however, a station will ordinarily have two poles to ground. The two poles would be interchanged by the polarization switch and the ground point would remain fixed. With the positions of polarization switches 12, 22 ... 62 illustrated in FIG. 1, stations 101, 102 and 103 operate as rectifiers and stations 104, 105 and 106 operate as inverters.

The transmission lines of the network are shown by their resistances $R_L1, R_L2 \ldots R_L6$ relative to a common network point P. The network may of course also be designed as a ring network or as a method network. In any case, however, the network configuration can be restructured to a star shape with corresponding resistance values.

Figure 2:
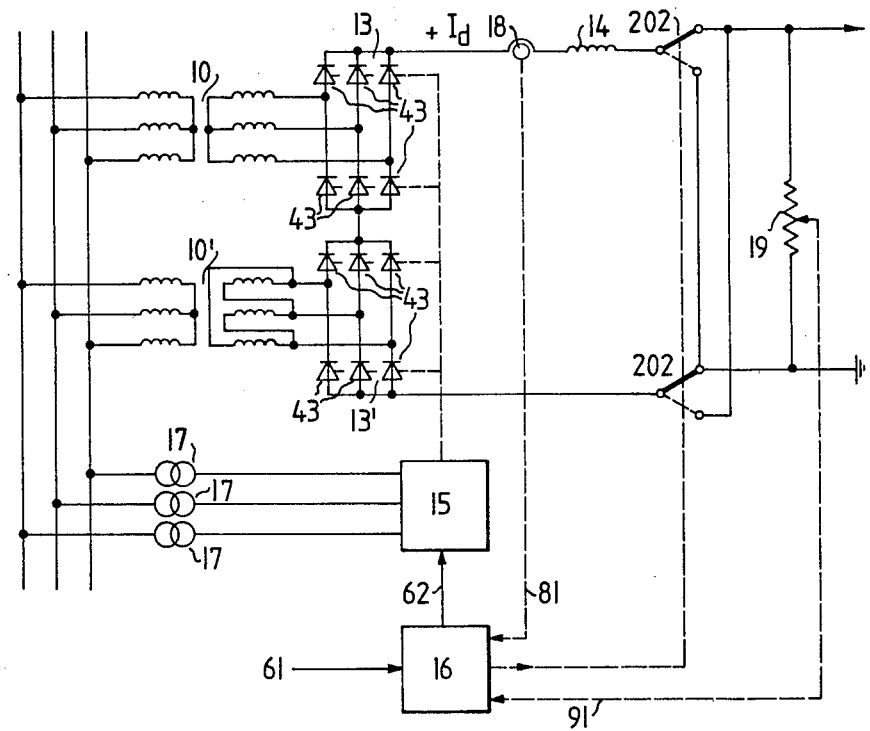
FIG. 2 is a circuit schematic for one transformer station in accordance with the invention.

FIG. 2 shows a circuit schematic for a single station operated according to the invention. FIG. 2 is generic to both rectifier and inverter stations. The rectifier portion includes two series connected partial rectifiers composed of a Y connected transformer 10, a delta connected transformer 10' and controllable bridge circuits 13 and 13' connected in series with transformers 10 and 10', respectively. Bridge circuits 13 and 13' include current valves 43, such as SCR's, which are controlled by phase position signals provided by a control unit 15. Control unit 15 is responsive to the three-phase network voltage obtained via voltage converters 17, and a control voltage 62. Control voltage 62 is produced by a regulating device 16 and is proportional to a firing delay angle $\alpha$ for valves 43.

Details of a control unit, which may be employed as control unit 15, are described, for example, in an article by E. Rumpf and S. Ranade "Comparison of Suitable Control Systems for HVDC Stations Connected to Weak AC Systems" in IEEE Transactions on Power, Apparatus and Systems, Vol. PAS-91, No. 2, pages 549 to 564.

An embodiment of a rectifier or an inverter station having transformers 10 and 10' and bridge circuits 13 and 13' is known, for example, from the book of E. Uhlmann "Power Transmission by Direct Current", Springer-Verlag, Berlin, Heidelberg, New York, 1975, pages 14 and 15.

A valve 43 mentioned above may be constructed as is known from a CIGRE-Report of the International Conference on Large High Voltage Electric Systems, 1982 Session—1-9 September "Design And Testing of Thyristor Valves And Their Components for the HVDC Back-To-Back Link Dürnrohr in Austria" by P. Lips, G. Thiele, H. Rötting and K. H. Weck.

In order to secure a constant idle voltage at the valve side of the transformers 10 and 10' adjustable step setters and devices for adjusting these step setters have to be provided at least at one of the transformers. A device for adjusting step setters of a transformer is known through the German Pat. No. 21 09 763.

The design of regulating device 16 depends on whether the station is a rectifier or inverter station, which, as noted above, is fixed by the polarity of polarization switch 202, which in the position illustrated, corresponds to switches 12, 22 and 32 of rectifier stations 101, 102 and 103, respectively, in FIG. 1.

Regulating device 16 is responsive to a DC measuring value 81 which is proportional to DC transmission line current $I_d$. Measuring value 81 is obtained, for example, from a current converter 18 which is coupled between bridge 13 and polarization switch 202. A smoothing choke 14 is interposed between converter 18 and switch 202. Regulating device 16 is further responsive to a predetermined voltage 61 and a locally measured voltage value 91 which is obtained, for example, from a voltage divider 19 connected accross the load and ground terminals of polarization switch 202.

Figure 3:
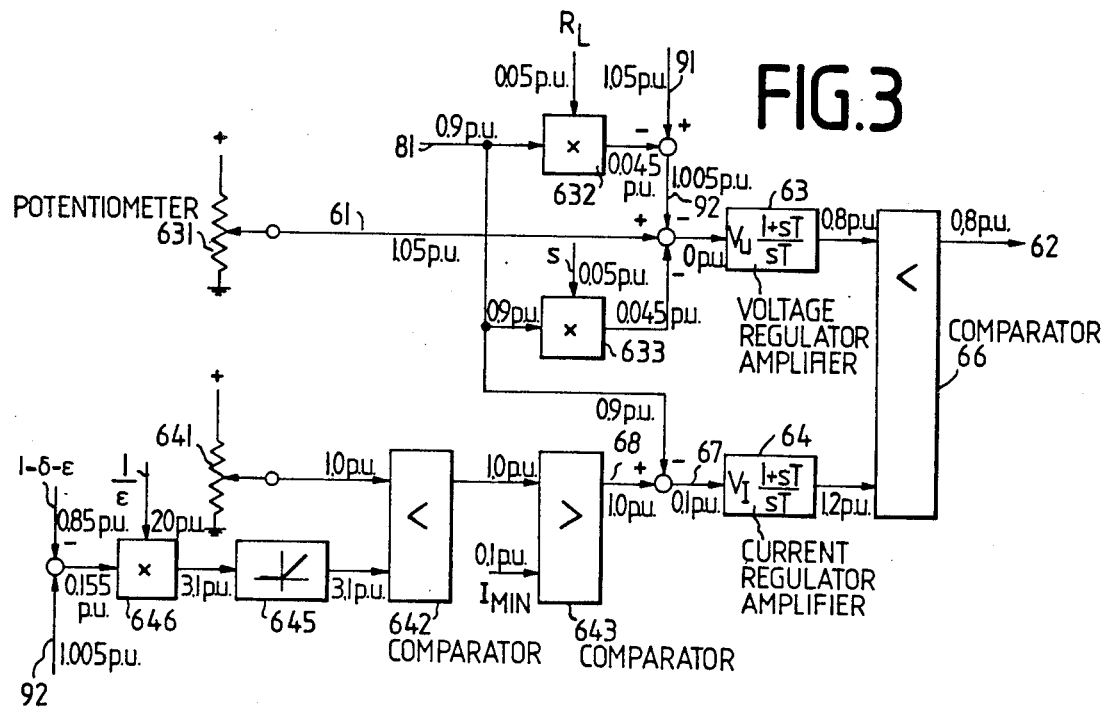
FIG. 3 illustrates the regulating equipment of a rectifier station in accordance with the invention.

FIG. 3 is a block diagram of regulating device 16, according to the invention, as employed in one of rectifier stations 101-103. Control voltage 62 is obtained via a comparator 66 which selects the smaller of the outputs produced by a voltage regulator amplifier 63 and a current regulator amplifier 64. Voltage regulator amplifier 63 regulates the voltage at common network point P. Current value 81 is combined with a signal proportional to line resistance $R_L$ in a multiplier 632, to produce a signal proportional to line voltage drop $I_d \cdot R_L$. An amplifier having the gain factor $R_L$ could be used in place of multiplier 632. Line voltage drop $I_d \cdot R_L$ is then subtracted from locally measured voltage 91 to form a voltage value 92 which is, in turn, subtracted from voltage 61.

Voltage 61 is the desired voltage for voltage regulator amplifier 63 and is obtained from a potentiometer 631. The value of voltage 61 constitutes the idle voltage value. Depending on the amount of line current, a member 633, which may be a multiplier, provides a value $s \cdot I_d$, where s corresponds to a given slope of the voltage characteristic of the voltage control and is, for example, 0.05, which value is substracted from voltage 61.

Current regulator amplifier 64 has an input which is formed of current measuring value 81 adjusted as follows. A voltage corresponding to the maximum desired current value for the rectifier station is set at a potentiometer 641. Normally, the maximum current will be the rated current $I_{dN}$. But if for operational reasons the station is able to carry only a smaller current, e.g. $I_d'$, this can also be set. This current value constitutes the absolute current limit of the rectifier station. A comparator member 642, which emits at its output the smaller of its two inputs, limits with respect to voltage the given desired current value. Based on $I_{dN}$ at a voltage $1-\delta$ per unit of rated voltage ($U_{dN}$) the desired current value for the station is linearly reduced to 0 at a voltage of $(1-\delta-\epsilon) \cdot U_{dN}$, where $\delta$ may be approximately 0.1 per unit of rated voltage ($U_{dN}$) and $\epsilon$ may be approximately 0.05 per unit of rated voltage ($U_{dN}$). This is accomplished by subtracting a voltage corresponding to $(1-\delta-\epsilon) \cdot U_{dN}$ from voltage value 92 and multiplying the result in multiplier 646 by $1/\epsilon$. The output of multiplier 646 is passed through element 645 which is constructed to pass only positive signals. A comparator 643 compares the output of comparator 642 with a minimum desired DC value $I_{MIN}$ and emits the larger one of these two input signals at its output 68. This sets a minimum DC value $I_{dMIN}$ for the station, which is algebraically combined with current measuring value 81 to form an input 67 to current regulator amplifier 64.

Figure 4:
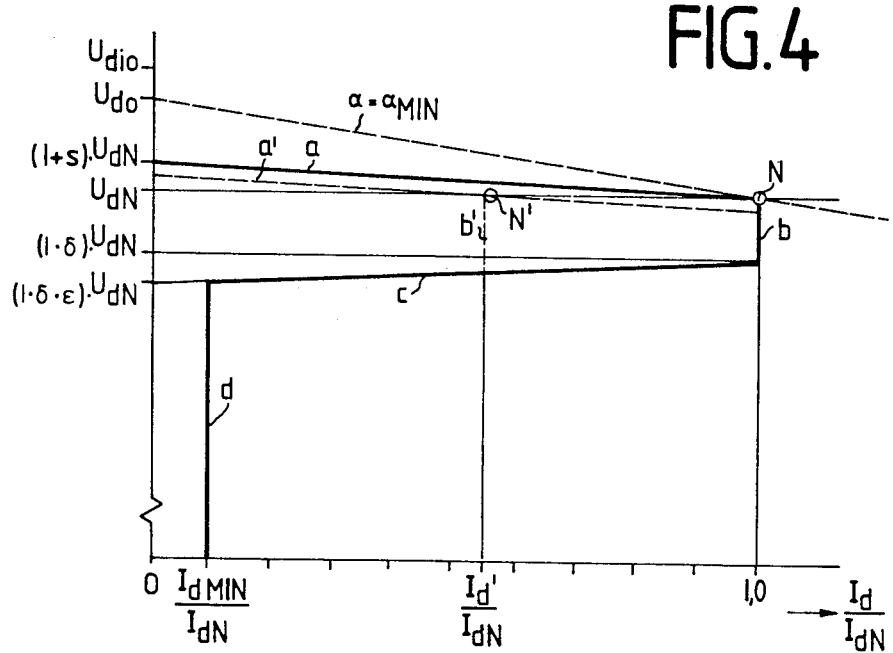
FIG. 4 is a digram showing the operating characteristics of a rectifier station equipped with regulating equipment in accordance with the invention.

The operating characteristic of the rectifier station produced by the above-described regulating devices, with respect to the common network point P, is shown in FIG. 4. In this characteristic, the letter a identifies the part of the characteristic realized by the voltage regulator. The letter b identifies the part of the characteristic given by the absolute current limit $I_{dN}$. The letter c identifies the part of the characteristic determined by the voltage dependent current limitation, and the letter d identifies the part of the characteristic determined by the minimum current regulation, $I_{dMIN}$. Normally, the station is intended to operate with voltage regulation, i.e. on the portion of the characteristic marked with the letter a. The rated operating point is at N. This point is common to the characteristic $\alpha = \alpha_{MIN}$ at which one station operates by setting a minimum control angle, and it can be seen that the rectifier station according to the invention need not be dimensioned any differently than stations of prior art design. Characteristic portion a may be shifted in the vertical direction to, for example, the dotted line a', by adjusting desired voltage value 61 at potentiometer 631. In this way the power emitted by the station can be varied. At rated voltage $U_{dN}$ at network point P, characteristic portion a' produces operating point N'. If the absolute current limit b is set at $I_{dN}$ this station would furnish higher currents up to the rated value if the network voltage were reduced to below its rated value.

Portion c of the characteristic serves to protect malfunctioning inverter stations against overloads. During inverter station malfunctions the direct voltage of the inverter station collapses. Due to portion c of the characteristic, the rectifier stations reduce their current to a minimum amount (characteristic portion d) so that the error current is limited. In a network including very many stations, it may be useful to operate only some of the rectifier stations with a finite minimum current and to set the minimum current to zero in the other stations. However, at least one of the rectifier stations must have a finite minimum current, so that after cases of malfunction, the network is charged up again and can continue operation as soon as the voltage level has been reestablished.

Figure 5:
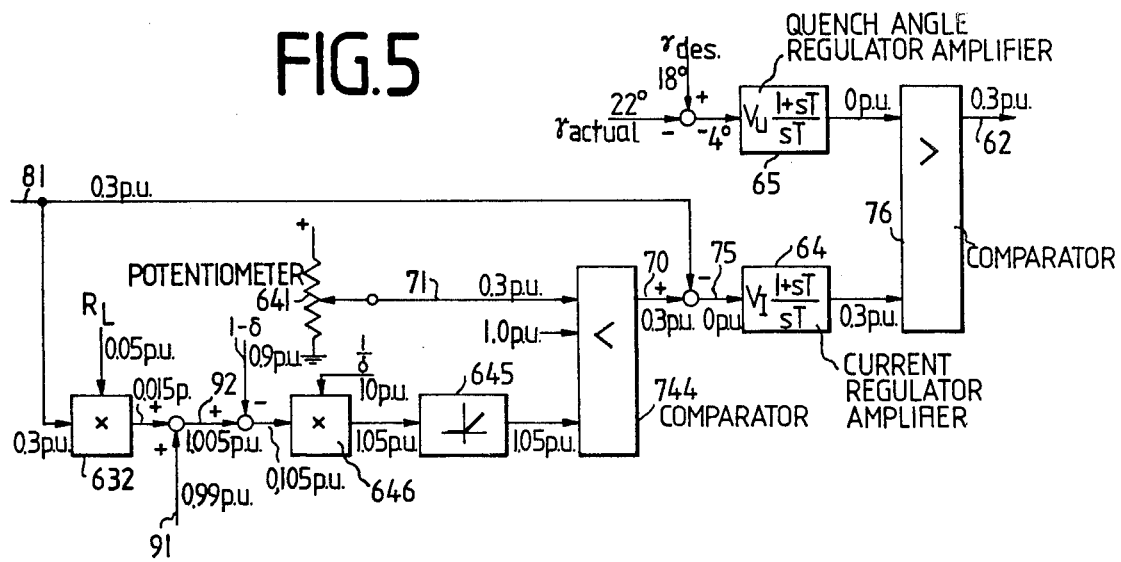
FIG. 5 illustrates the regulating equipment for an inverter station according to the invention.

The regulating devices of an inverter station are shown in FIG. 5. Comparator 76 selects the greater value of the output value of a quench angle regulator amplifier 65, and the output value of a current regulator amplifier 64, to produce control voltage 62, which again is proportional to angle $\beta$ of valves 43. Quench angle regulator amplifier 65 is constructed in a known manner for regulating deviation of the actual value $\gamma_{actual}$ from the desired value $\gamma_{des}$ of the quench angle of inverter valves 43. It is also possible to use one of the known quench angle control methods.

A quench angle regulator and a method for quench angle control is known, for example, from the U.S. Pat. No. 4,212,055 (Podlewski).

Input 75 to current regulator amplifier 64 is formed of current measuring input 81 from current converter 18, and a current control input 70 produced by comparator 744 which switches through the respectively smaller one of its input values to its output. An input value proportional to 1.0 per unit of rated current limits control input 70 to the rated current value of the inverter station. A voltage value 71 set at potentiometer 641 represents the desired current of the inverter station during operation. The output of element 645 limits current control input 70 in dependence on its input voltage in a range from $I_{dN}$ at $U_{dN}$ to 0 at $(1-\delta)\cdot U_{dN}$. In order to maintain a constant voltage at common network point P, locally measured voltage 91 is added to a value formed of the measured current value 81 multiplied in multiplier 632 with the value $R_L$ of the line resistance, to form voltage value 92. The voltage value corresponding to $1-\delta$ per unit of rated voltage is subtracted from the voltage value 92 and the result is multiplied in multiplier 646 with a factor $1/\delta$. Element 645 passes only positive values received from multiplier 646.

Figure 6:
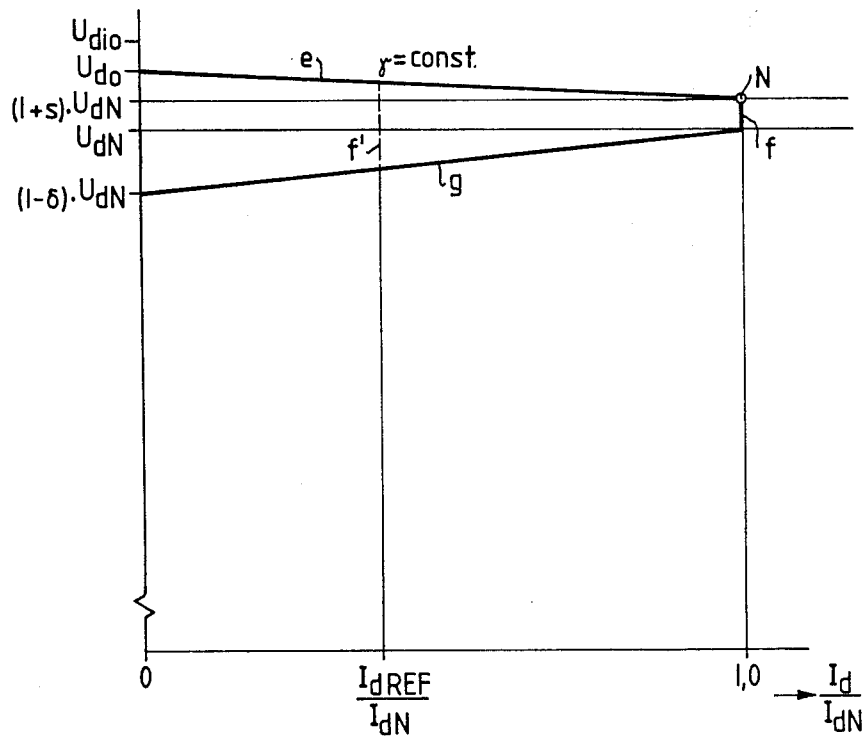
FIG. 6 is a diagram showing the operating characteristics of an inverter station equipped with regulating equipment according to the invention.

The operating characteristics of an inverter station realized with the equipment according to FIG. 5 are shown in FIG. 6. Part e of the characteristic is determined by quench angle regulator amplifier 65 which assures stable operation of the inverter station. Part f of the characteristic is produced by current regulator amplifier 64 with a maximum control input of 1.0 per unit of rated current. When desired current value 71 is less than rated current, characteristic f' results at point $I_{dREF}$. Part g of the characteristic is produced when the voltage dependent control input from element 645 is passed by comparator 744.

The rated design point N of the inverter station must be selected in such a way that the quench angle regulation at rated current occurs at voltage $(1+s)\cdot U_{dN}$. This is necessary because if there is only one operational inverter station in a network having a plurality of operational rectifier stations, it is still able to receive its rated current. If the current is very low, the rectifier stations set a voltage near $(1+s)\cdot U_{dN}$. The operating point of the inverter station with quench angle control is given by the point of intersection of the $\gamma =$ constant characteristic at $(1+s)\cdot U_{dN}$ and must therefore lie at least at the current value $I_{dN}$ (design point N).

An example of numerical values is given with the p.u. values in FIGS. 3 and 5. The p.u. values relate to either $U_{dN}$ and $I_{dN}$ and may be represented in the control equipment by $10 \text{ V} \triangleq 1$ p.u. The basic values are chosen:

---

$s = 0.05$ p.u.
$\zeta = 0.1$ p.u.
$\epsilon = 0.05$ p.u.
$U_{d i0} = 1.2 \cdot U_{dN}$      $I_{dN}\cdot R_L = 0.05$ p.u.
$\gamma = $ const $= 18°$
$\alpha_{MIN} = 15°$

---

The numerical values are related to the operating points of FIGS. 7b (rectifier) and 7c (inverter), which are described in detail further down.

According to the invention, the value $\delta$ is to be equal for all stations, and the values s and $\epsilon$ are to be equal for all rectifier stations. There are, then, two primary operating states for a network having any desired number of stations. In normal operation, all inverter stations operate with current regulation, characteristic part f, and all rectifier stations operate with voltage regulation, characteristic part a. This state is shown in FIGS. 7a–7e for a network having two rectifier stations (GR 1, GR 2) and three inverter stations (WR 1, WR 2, WR 3). To simplify the explanation, the rated current of all stations is assumed to be selected the same. In FIG. 7, the current control inputs of the inverter stations are set in such a way that their sum does not exceed the sum of the rectifier rated currents. WR 1 is set to $0.3\cdot I_{dN}$, WR 2 is set to $0.5\cdot I_{dN}$ and WR 3 is set to $1\cdot I_{dN}$.

The operating points are determined by the common voltage $U_B$ at network point P at which the Kirchhoff node rule $\Sigma I_d = 0$ is also met at network point P. This occurs somewhat above $U_{dN}$. The operating points B1, B2 of the rectifier stations lie on the voltage regulation part of their characteristic, while the operating points BW 1, BW 2, BW 3 of the inverter stations lie on the current regulation part of their characteristic.

FIGS. 8a-8e show the operating state of the same network when the sum of the current control inputs given in the inverter stations exceeds the sum of the currents emitted by the rectifier stations. The rated current is given in each of the inverter stations. The rectifiers reach their current limiting regulation and thus the direct voltage is reduced. In the inverter stations, the effective current control input is reduced according to part g of the characteristic due to the voltage that has dropped below the rated value. The operating points are again determined under the condition of equal voltage, and meeting the node point rule $\Sigma I = 0$, in network point P.

The rectifier stations operate with current regulation at operating points B1, B2. The inverter station operating points BW 1, BW 2, BW 3 lie at $\frac{2}{3} \cdot I_{dN}$ on part g of the characteristic. This shows that even with unreasonable current control inputs, operation of the network continues without requiring a telecommunications connection. The case illustrated by FIG. 8 happens only in exceptional circumstances. Generally, a network will initially have available sufficient rectifier power before the inverters take over their power. The case of FIGS. 8 may occur, however, if a third rectifier station had previously been in operation, resulting in a state similar to FIG. 7, which was then disconnected, for example, due to a malfunction.

It will be understood that the above description of the present invention is susceptible to various modifications, changes and adaptations, and the same are intended to be comprehended within the meaning and range of equivalents of the appended claims.

What is claimed is:

1. A method for transmitting power between a plurality of locally separated transformer stations of a high voltage DC transmission system wherein each station has a DC end and an AC end, the DC end of each station is connected to a respective one of a plurality of transmission lines connected in network having a common network point, and each station is connected at its AC end with a respective local three-phase network, each station including a rectifier portion having a positive pole and a negative pole and a polarization reversal switch for selectively connecting the respective one of the transmission lines to its positive pole for operation of the station as a rectifier station or to its negative pole for operation of the station as an inverter station, each station being operated to maintain a direct current in its respective transmission line and a direct voltage at that pole which is connect to its respective transmission line, wherein at least one transformer station is connected as a rectifier station and at least one transformer station is connected as an inverter station, said method comprising:

(a) controlling the rectifier portion of each station via a first regulating device to regulate the direct current in the respective transmission line to a desired value; and (b) controlling the rectifier portion of each station via a second regulating device which dominates the first regulating device to set the direct voltage at that pole of each station which is connected to the respective transmission line to a given limit value with reference to the common network point; and wherein (c) in the at least one rectifier station
   (1) said step of controlling to set the direct voltage includes reducing the given limit value linearly with the direct current until the given limit value reaches a rated direct voltage value of that rectifier station at a rated direct current value of that rectifier station; and
   (2) said step of controlling to regulate the direct current includes adjusting the desired value of the direct current in dependence on the direct voltage value of that rectifier station such that in a voltage range from 1 per unit of rated voltage value to $1-\delta$ per unit of rated voltage value the desired direct current value corresponds to the rated direct current value and in a voltage range from $1-\delta$ per unit of rated voltage to $1-\delta-\epsilon$ per unit of rated voltage value the desired direct current value is linearly reduced to a preset minimum value, where $\delta$ and $\epsilon$ are preselected fractions; and (d) in the at least one inverter station, said step of controlling to regulate the direct current includes limiting the value of desired direct current in linear dependence on the direct voltage value of that inverter station, starting from the rated current value of the inverter station at a direct voltage of 1 per unit of rated voltage value down to zero current at a direct voltage of $1-\delta$ per unit of rated voltage value.

2. A method as defined in claim 1 wherein the rectifier portion of each transformer station includes at least one transformer having adjustable step setters, and current valves connected to the at least one transformer, and said method includes producing a constant idle voltage at the valve side of the transformer via devices for adjusting the step setters in the at least one transformer.

3. A method as defined in claim 2 including connecting the valves together to form two partial rectifiers which are in turn connected together to form the positive and negative poles.

4. A method as defined in claim 1 wherein $\delta$ is preselected at 0.1 and $\epsilon$ is preselected at 0.05.

* * * * *